(12) United States Patent
Grossman et al.

(10) Patent No.: US 6,585,448 B2
(45) Date of Patent: Jul. 1, 2003

(54) BRACKET

(75) Inventors: Joel Grossman, Petaling Jaya (MY); Howard Porter, Kuala Lumpur (MY)

(73) Assignee: Grossman Product Services SDN. BHD., Kuala Lumpur (MY)

( * ) Notice: Subject to any disclaimer, the term of this patent is extended or adjusted under 35 U.S.C. 154(b) by 0 days.

(21) Appl. No.: 09/760,844

(22) Filed: Jan. 17, 2001

(65) Prior Publication Data

US 2002/0102133 A1 Aug. 1, 2002

Related U.S. Application Data

(60) Provisional application No. 60/207,226, filed on May 26, 2000.

(51) Int. Cl.$^7$ ............................. F16B 12/54; F16B 12/00
(52) U.S. Cl. ........................ 403/403; 5/288; 5/282.1
(58) Field of Search .................. 403/403, 231; 5/288, 282.1, 37.1, 292, 301, 304; 52/712, 700, 699

(56) References Cited

U.S. PATENT DOCUMENTS

| | | | | |
|---|---|---|---|---|
| 237,806 A | * | 2/1881 | Brown | 403/403 |
| 471,610 A | * | 3/1892 | Hart | 403/403 |
| 501,564 A | * | 7/1893 | Goodyear | 403/403 |
| 4,316,676 A | * | 2/1982 | Turner | 403/260 |
| 4,545,103 A | * | 10/1985 | Bryant | 29/432 |
| 4,862,543 A | * | 9/1989 | Falwell et al. | 5/663 |
| 4,973,187 A | * | 11/1990 | Sauder | 403/205 |
| 5,364,203 A | * | 11/1994 | Ishikawa | 403/403 |
| 5,674,023 A | * | 10/1997 | Williams | 403/231 |
| 5,860,759 A | * | 1/1999 | Leicht | 403/334 |
| 5,885,024 A | * | 3/1999 | Zupan et al. | 403/389 |

FOREIGN PATENT DOCUMENTS

| | | |
|---|---|---|
| CH | 509514 | 8/1971 |
| DE | 2124255 | 11/1972 |
| GB | 757262 | 9/1956 |
| GB | 921809 | 3/1963 |
| GB | 1291151 | 10/1972 |

* cited by examiner

*Primary Examiner*—Robert J. Sandy

(57) ABSTRACT

A bracket and method for connecting two component members, where the bracket is concealed from the outside of a joint formed by the two component members. The bracket includes a first flange having a hole for receiving a securing member and at least one second flange, including at least one protrusion for engaging a cavity in a first member to be secured. This design may use a single screw or bolt, and therefore saves assembly time and reduces product cost.

34 Claims, 5 Drawing Sheets

BRACKET

CROSS-REFERENCE TO RELATED APPLICATIONS

This application claims the benefit under 35 U.S.C. §119 (e) of U.S. Provisional Application of Joel Grossman entitled "Bracket", Ser. No.: 60/207,226, filed on May 26, 2000, the entire contents of which are hereby incorporated by reference.

FIELD OF THE INVENTION

The present invention is generally directed to a bracket, and more particularly, to a bracket which secures two component members together and can be concealed from the outside of the joint.

BACKGROUND

DESCRIPTION OF THE RELATED ART

There are several conventional techniques for connecting two component members. One technique, illustrated in FIG. 1, is termed a mortise and tenon. The mortise 102 is a cavity in component member 100, which accepts the tenon 202 of component member 200. FIG. 2 illustrates two other conventional techniques, the tongue and groove and dowels and holes. As illustrated in FIG. 2, the groove 104 is a cavity in component member 100, which accepts the tongue 204 of component member 200. FIG. 2 also illustrates a dowel 302, which may be separate from or integral to component member 200. Dowel 302 is fit inside hole 206 in component member 200. In each of the above-identified exemplary conventional techniques, one or more mortise/tenon, tongue/groove and/or dowel/hole arrangement can be used.

Each of the above-identified exemplary conventional techniques, which are often used in the field of wood joinery, connects two component members by providing shear support. However, none of the above-identified exemplary conventional techniques adequately ensure the two component members remain secured together; the only factor being the tightness of fit between the tenon/tongue/dowel and the respective mortise/groove/hole.

In many applications, wood joinery included, it is also important that the two component members remain secured together.

Clips or brackets are also conventionally used for connecting two members, either alone or in combination with the exemplary conventional techniques described above. Although conventional clips and brackets usually ensure the two component members remain secured together, when conventional clips or brackets are used to connect two component members of a piece of furniture, the presence of the clip or bracket degrades the appearance of the furniture.

Further, conventional brackets, in order to be effective, usually require a bolt or screw for each component being assembled. In the standard case, if two component members are being secured, at least two bolts or screws are required, one for each component member. Requiring at least one screw for each component member makes conventional brackets expensive to make and time consuming to use for assembly.

SUMMARY OF THE INVENTION

The present invention solves these problems by providing a bracket which is usable to connect two component members, where the bracket can be concealed from the outside of the joint, in order to create a clean and furniture-like surface. The design of the bracket pulls two component members to be secured tightly together through the use of at least one member which hooks into one of the component members and is drawn tight to the component member when a securing device is tightened. Further, the bracket of the present invention may be designed to accommodate a single screw or bolt, in order to save assembly time and reduce cost.

DETAILED DESCRIPTION OF THE INVENTION

Figure 1:
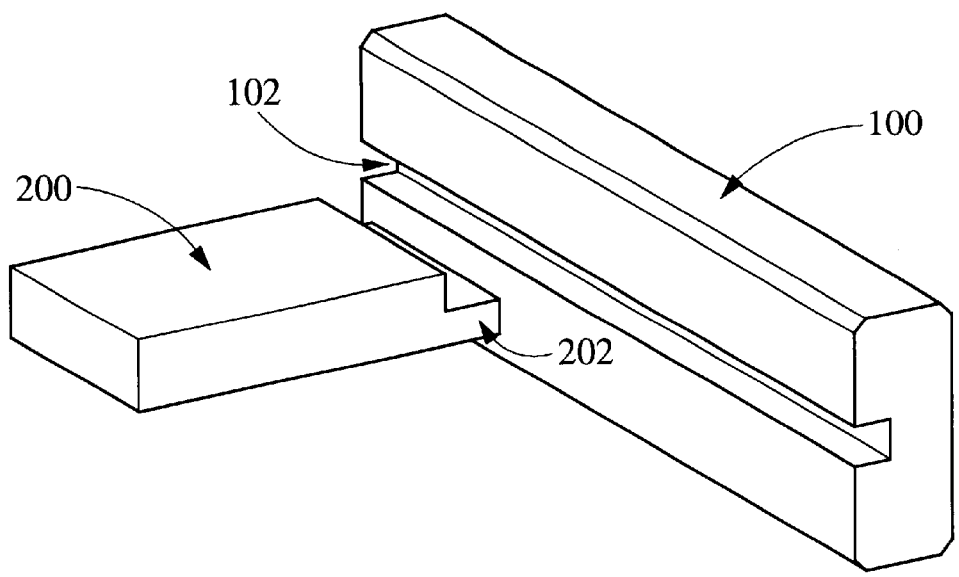
FIGS. 1–2 illustrate several conventional techniques for securing two component members.

Referring to FIGS. 3–10, a bracket 1, in a substantially L-shape, is illustrated including flanges 2 and 3 and a hook 5 at the end of flange 2, which is turned at substantially 90° to flange 2. In one preferred embodiment, the hook 5 is oriented in a substantially parallel, but opposite direction to flange 3.

Figure 5:
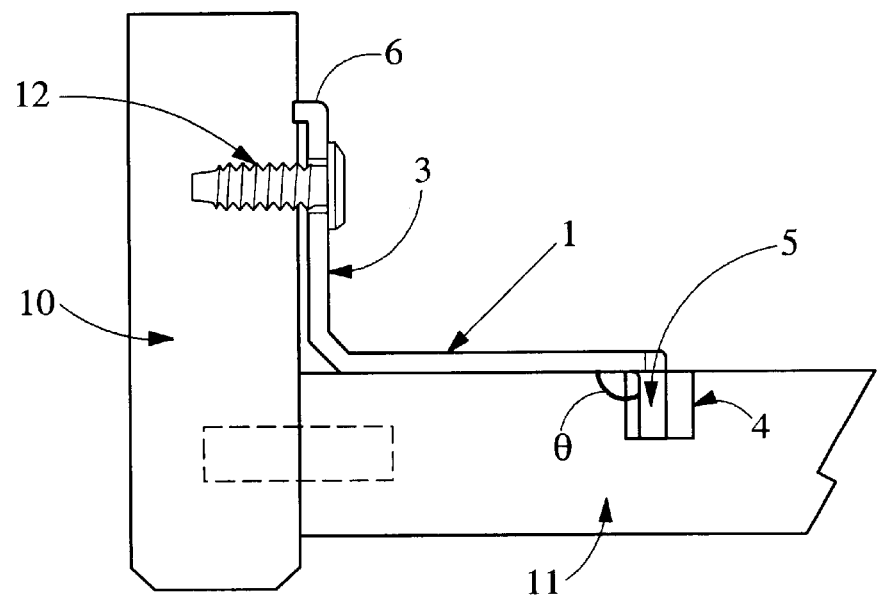
Figure 6:
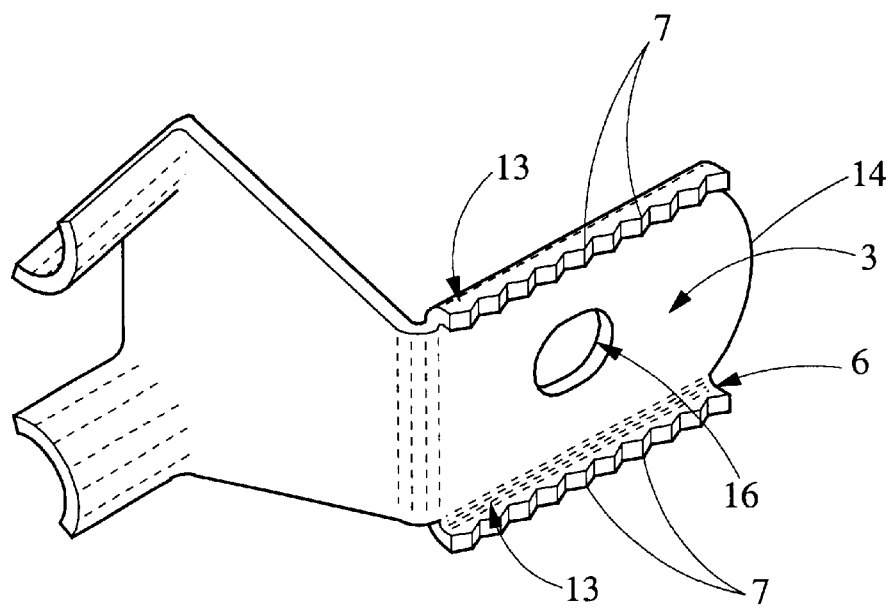

In one preferred embodiment, as illustrated in FIG. 5, the angle $\Theta$ is less than 90°, for example, 88°, in order to provide the hook 5 with additional resistive capabilities.

Component members 10 and 11, fit internally with at least one connecting dowel (or similar mortise/tennon or tongue/groove arrangement), are fixedly joined together by bracket 1 through the insertion of the hook 5 into a hole or indent provided in member 11 and through the screwing of bolt 12, through hole 16, provided in member 10.

The design of bracket 1 pulls the two component members 10 and 11 tightly together through the use of the hook 5, which hooks into one of the component members (in FIGS. 3–5, component member 11), and is drawn tight to the component member 10, when bolt 12 is tightened. The bracket 1 connects the joint of the component members 10 and 11 while being fastened at an inside concealed corner of the joint, in order to hide the bracket 1 and the bolt 12 from plain view. The bracket 1 is also designed to be attachable using a single screw or bolt 12 to simplify customer assembly. In a preferred embodiment, the bracket 1 is made of a metal or other strong material, conventionally used to join component members together to form a fixed joint.

Figure 3:
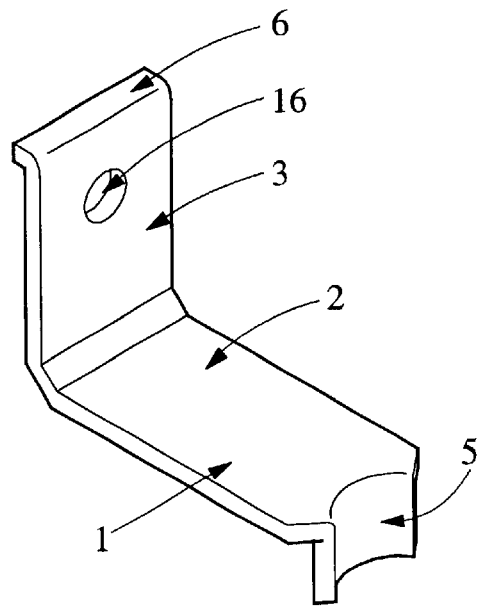
FIGS. 3–10 illustrate several views of the bracket of the present invention in several exemplary embodiments.

In a variation on the bracket 1 illustrated in FIGS. 3–6, an extension 6 illustrated in FIGS. 3 and 5 permits further tightening of the bracket 1 to component member 10 by providing a gap between the flange 3 and the component member 10, which thereby provides resistance of the bracket 1 against the bolt head 12, while not allowing flange 3 to bottom out and touch component member 10. In another variation of the bracket 1 illustrated in FIGS. 3–10, the extension 6 may be in the form of teeth or other serrations which further grip the component member 10. In another variation on bracket 1, an extension 6 is used in combination with teeth or serrations. In yet another variation on the bracket 1 illustrated in FIGS. 6 and 9–10, the extension 6, teeth 7, or extension 6 and teeth 7 may be placed on the side edge(s) 13 of the flange 3 in addition to or instead of on the end portion 14 of the flange 3.

Figure 4:
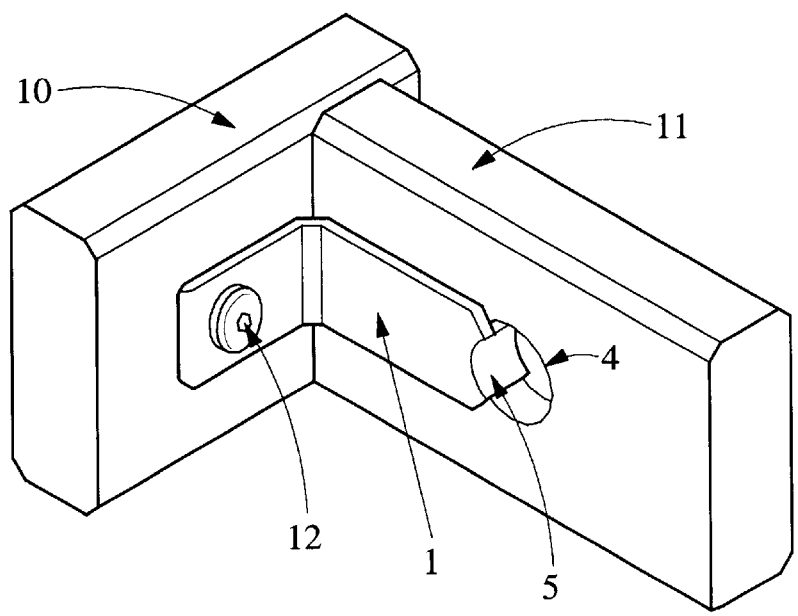
Figure 7:
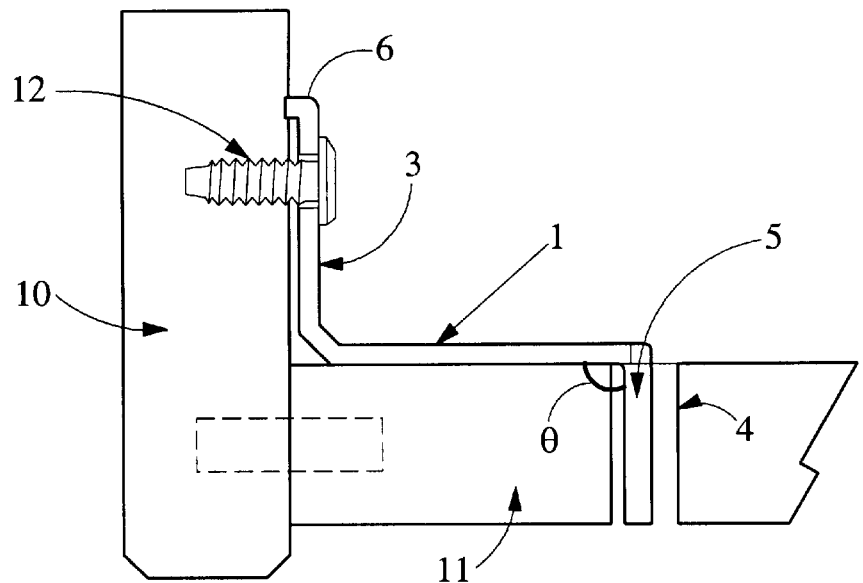
Figure 8:
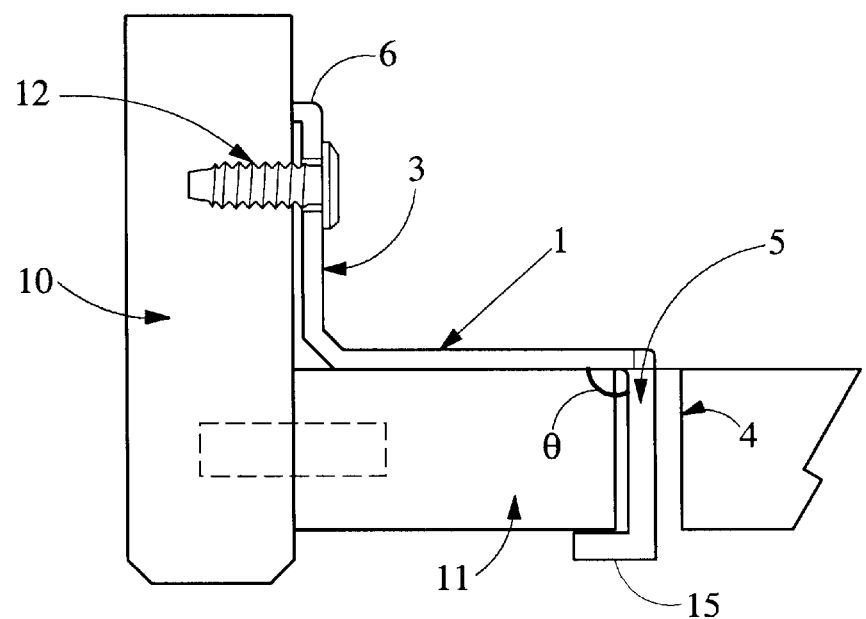
Figure 10:
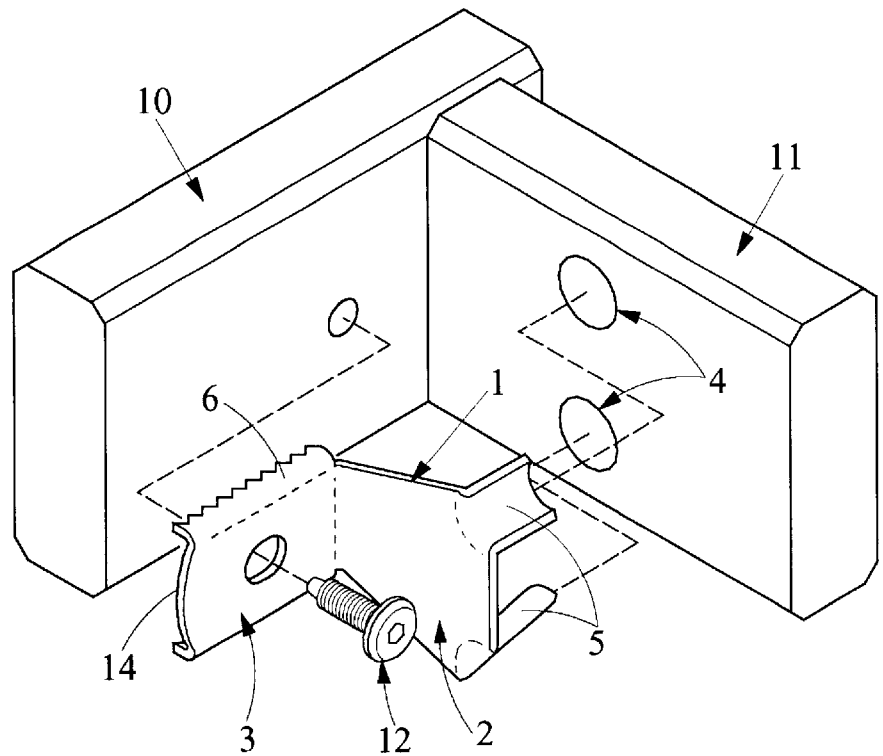

In one exemplary embodiment, as illustrated in FIGS. 3, 4, and 10 the hook 5 is contoured such that it has the same shape as the hole 4. In another exemplary embodiment, the hole 4 may be replaced with a mortise, groove, or other cavity. In the embodiment illustrated in FIG. 5, the hole 4 or cavity does not go entirely through component 11. In other embodiments, the hole 4 or cavity could be completely through component 11 as illustrated in FIG. 7, and the hook 5 could include an extension 15, which protrudes through component 11 on the other side of component member 11 as illustrated in FIG. 8.

Figure 9:
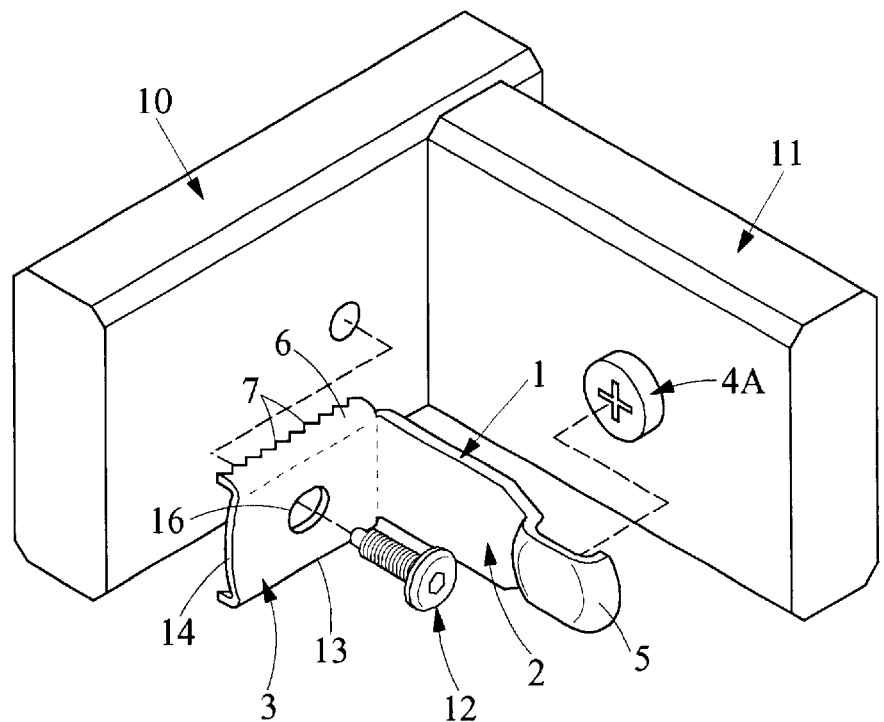

In the exemplary embodiment as illustrated in FIG. 5, the hook 5 is secured via interaction with a hole, mortise, or groove. In alternative embodiments, the hook 5 could engage with a protrusion 4A on component 11, such as illustrated in FIG. 9. The protrusion may be integral, for example, a ledge, or separate but secured to the component 11, for example, a corresponding upwardly facing hook. The hook 5 and corresponding hook (for example, an upwardly facing hook) could be contoured to ensure they remain secured together. In another exemplary embodiment, the flanges 2 and 3 and the hook 5 are integrally formed. Although a bolt 12 has been illustrated in the Figures, another securing member such as a screw or nail could also be utilized.

In another exemplary embodiment, the bracket 1 may include more than one flange 2, each with a hook 5.

In another exemplary embodiment, each flange 2 may include two or more hooks 5. In another exemplary embodiment, the two hooks 5 may form the ends of a "V" shape, with the two legs of the "V" meeting near the bend where the flanges 2 and 3 meet. This arrangement may permit the hooks 5 to bear more weight when pulled tight by the bolt 12. Such an arrangement is illustrated in FIG. 10.

As illustrated in FIGS. 4 and 5, the bracket 1 is located on an inside portion of the joint of component members 10 and 11 and is out of plain view. In one exemplary embodiment, component members 10 and 11 are parts of the frame of a piece of furniture. In one exemplary embodiment, the piece of furniture may be a futon sofa bed. It is noted that several embodiments are described above. To the extent physically possible, the features and variations described in these embodiments may be used either singly or in combination with any other described embodiments.

Figure 2:
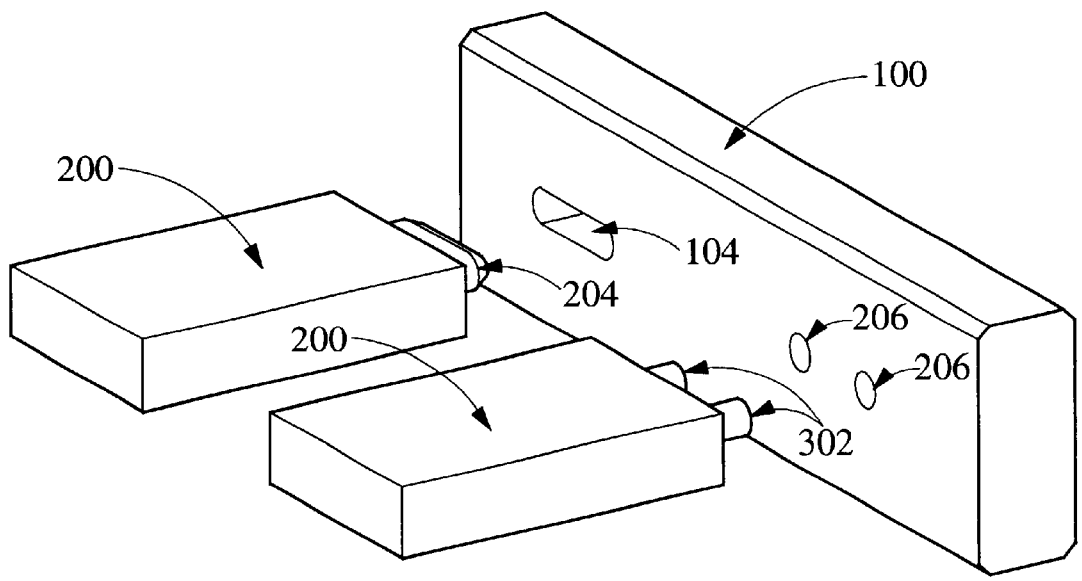

Another aspect of the present invention is directed to a method for securing two components 10, 11, which have either been secured to provide shear support or not. If not, the first step of securing the two component members 10, 11 includes the step of connecting the two component members 10, 11 by providing shear support. Examples of such techniques are described in connection with FIGS. 1 and 2. If the two component members 10, 11 are already secured together to provide shear support, then this step may be omitted. The next step, includes inserting the hook 5 or other extension into a cavity or other hole 4 and then aligning the flange 3 over the hole 16 in the component number 10. That step includes inserting a securing member 12, such as a screw, bolt, or nail through the hole in the flange 3 and through the hole 16 in component number 10. The next step includes tightening the securing member so that either the flange 3 is flush against a surface of component 10 or so that extension 6, located either on the end or on the sides (or both) of flange 3, and either including or not including serrations such as teeth 7 on the end, sides (or both), contact the surface of component number 10. As would be evident to one of ordinary skill in the art, all the variations described above in connection with the bracket illustrated in FIGS. 3–10 are also applicable to the method of securing described here.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A bracket comprising:
   a first flange having a hole for receiving a securing member; and
   at least one second flange, including at least one protrusion for engaging a first member to be secured, wherein the at least one protrusion engages a protrusion on the first member to be secured.

2. The bracket of claim 1, said first flange further including an extension for providing a gap between said first flange and a second member to be secured.

3. The bracket of claim 2, wherein the extension is located on an end portion of the first flange.

4. The bracket of claim 3, wherein the at least one protrusion engages an indent in the first member to be secured.

5. The bracket of claim 4, wherein the at least one protrusion is contoured to the indent.

6. The bracket of claim 3, wherein an angle between the at least one second flange and the at least one protrusion is less than 90°.

7. The bracket of claim 6, wherein the angle is approximately 88°.

8. The bracket of claim 2, wherein the extension is located on at least one side portion first flange.

9. The bracket of claim 2, wherein the extension includes gripping members to grip the second member.

10. The bracket of claim 9, wherein the gripping members are teeth or serrations.

11. The bracket of claim 1, wherein the first flange and the at least one second flange are integrally formed.

12. A bracket comprising:
    a first flange having a hole for receiving a securing member and an extension for providing a gap between said first flange and a second member to be secured; and
    at least one second flange, including at least one protrusion for engaging a first member to be secured,
    wherein the extension includes gripping members to grip the second member.

13. The bracket of claim 12, wherein the gripping members are teeth or serrations.

14. The bracket of claim 12, wherein the securing member is one of a bolt, screw, or nail.

15. The bracket of claim 12, wherein the first and second members to be secured are parts of a frame of furniture.

16. The bracket of claim 15, wherein the furniture is a futon sofa bed.

17. A method of securing two members, comprising:
    engaging at least one protrusion of a first flange of a bracket with a first member, the at least one protrusion engaging a protrusion on the first member to be secured;
    aligning a hole in a second flange with a hole in a second member and inserting a securing member; and
    moving the securing member such that the first member and the second member are pulled together as a result of the at least one protrusion and the securing member.

18. The method of claim 17, wherein the second flange further includes an extension for providing a gap between the second flange and the second member to be secured.

19. The method of claims 18, wherein the extension is located on an end portion of the second flange.

20. The method of claim 18, wherein the extension is located on at least one side portion of the second flange.

21. The method of claim 20, wherein the extension includes gripping members to grip the second member.

22. The method of claim 21, wherein the gripping members are teeth or serrations.

23. The method of claim 17, wherein an angle between the at least one second flange and the at least one protrusion is less than 90°.

24. The method of claim 23, wherein the angle is approximately 88°.

25. The method of claim 17, wherein the first flange and the second flange are integrally formed.

26. The method of claim 17, wherein the securing member is one of a bolt, screw, or nail.

27. A method of securing two members, comprising:

engaging at least one protrusion of a first flange of a bracket with a first member;

aligning a hole in a second flange with a hole in a second member and inserting a securing member, the second flange further having an extension for providing a gap between the second flange and the second member to be secured, and wherein the extension includes gripping members to grip the second member; and moving the securing member such that the first member and the second member are pulled together as a result of the at least one protrusion and the securing member.

28. The method of claim 27, wherein the at least one protrusion engages an indent in the first member to be secured.

29. The method of claim 28, wherein the at least one protrusion is contoured to the indent.

30. The method of claim 27, wherein the gripping members are teeth or serrations.

31. The method of claim 27, wherein said method is used to secure parts of a frame of furniture.

32. The method of claim 31, wherein the furniture is a futon sofa bed.

33. A bracket comprising:

a first flange having a hole for receiving a securing member, the first flange further including an extension for providing a gap between said first flange and a first member to be secured; and at least one second flange, including at least one protrusion for engaging a second member to be secured.

34. A bracket comprising:

a first flange having a hole for receiving a securing member; and a second flange formed substantially in a V shape, the second flange including two protrusions for engaging a second member to be secured.

* * * * *